United States Patent [19]

Konstantinides et al.

[11] Patent Number: 5,321,645

[45] Date of Patent: Jun. 14, 1994

[54] SIMPLIFIED METHOD AND APPARATUS FOR LOSSY SIGNAL COMPRESSION

[75] Inventors: Konstantinos Konstantinides, San Jose; Balas K. Natarajan, Los Gatos, both of Calif.

[73] Assignee: Hewlett-Packard Company, Palo Alto, Calif.

[21] Appl. No.: 92,308

[22] Filed: Jul. 15, 1993

[51] Int. Cl.⁵ .......................... G06G 7/28; G06F 7/00
[52] U.S. Cl. ................................. 364/852; 364/715.02
[58] Field of Search ................. 364/852, 851, 715.02, 364/608

[56] References Cited

U.S. PATENT DOCUMENTS

| | | | |
|---|---|---|---|
| 4,143,363 | 3/1979 | Dotter, Jr. | 364/608 |
| 4,464,727 | 8/1984 | Parkes et al. | 364/608 |
| 4,521,865 | 6/1985 | Winkler et al. | 364/608 |
| 4,583,188 | 4/1986 | Can et al. | 364/608 |
| 4,713,771 | 12/1987 | Crop | 364/608 |

OTHER PUBLICATIONS

M. Ishijima et al., "Scan-Along Polygonal Approximation For Data Compression of Electrocardiograms", Nov. 1983, IEEE Transactions on Fiomedical Engineering, vol. BME-30, No. 11, pp.723-729.

Hiroshi Imai et al., "Polygonal Approximations Of A Curve - Formulations & Algorithms", 1988, Computational Morphology, pp. 71-86.

B. K. Natarajan et al., "On Sparse Approximations Of Curves & Functions", Aug. 1992, Proc. of the 4th Canadian Conference On Computational Geometry, St John's, pp. 250-255.

Y. Ohtaki et al., "On Compressing Method Of EEG data For Their Digital Database", Sep. 1992, IEEE, Publication No. 0-7803-0532-9/92, pp. 581-584.

K. Konstantinides et al., "An Architecture For Lossy Signal Compression", Aug. 1992, HP Laboratories Technical Report, pp. 1-12.

*Primary Examiner*—Tan V. Mai
*Attorney, Agent, or Firm*—Edward Y. Wong

[57] ABSTRACT

Although data compression methods exist in the prior art, some of which would result in an optimal number of piecewise linear approximation segments for the compressed output signal, these compression methods require complicated calculations and data processing that inhibit real time signal processing and portability in hardware implementation. A novel method for signal compression with a known level of loss by selecting a level of acceptable error is described. With this new compression method, the number of additional approximation segments to its compressed output signal is generally 50% more than the optimal number obtained in the prior art. However, its processing simplicity allows for improved real time signal processing and simplified practical hardware implementation.

8 Claims, 8 Drawing Sheets

SIMPLIFIED METHOD AND APPARATUS FOR LOSSY SIGNAL COMPRESSION

BACKGROUND OF THE INVENTION

In many digital signal processing applications, constraints on local memory sizes necessitate the use of some form of data compression to process the signal. Inherent with effective data compression, however, is a certain degree of data loss. When this loss becomes too great, the resultant compressed data will become unsuitable and unacceptable. However, in the many cases of signal processing where only the general characteristics and behavior of the data are of interest, a compression technique with a known and controlled level of loss may still be acceptable. For example, Ishijama et al. in "Scan-along Polygonal Approximation for Data Compression of Electrocardiograms," *IEEE Transactions on Biomedical Engineering*, Vol. BME-30, No. 11, pp. 723-729 (1983), show that in processing and storing electrocardiogram (ECG) data, considerable distortion can be tolerated in the approximation of the peak in the so called "PQ" segment. Similarly, others have shown that in many voice-mail applications, using suitable lossy techniques for the compression of the voice signal has negligible effects on the signal quality, and lossy techniques may still be acceptable.

Recently, Imai and Iri in "An Optimal Algorithm for Approximating a Piecewise Linear Function," *Journal of Information Processing*, Vol. 9, No. 3, pp. 159-162 (1986) and Natarajan and Ruppert in "Sparse Approximation to Curves and Functions," *Proc. of the Fourth Canadian Conference on Computational Geometry*, St. John's, August 1992, have described an efficient method for compressing waveforms with an acceptable level of loss. Given a specified error, this method approximates data with a piecewise linear function that results in a minimum number of approximation segments. This optimal method in the prior art does not require uniform sampling, and it permits the error to be defined independently at each sample point. These features make this optimal lossy method of compression in the prior art particularly attractive for a large number of signal processing applications.

Figure 1:
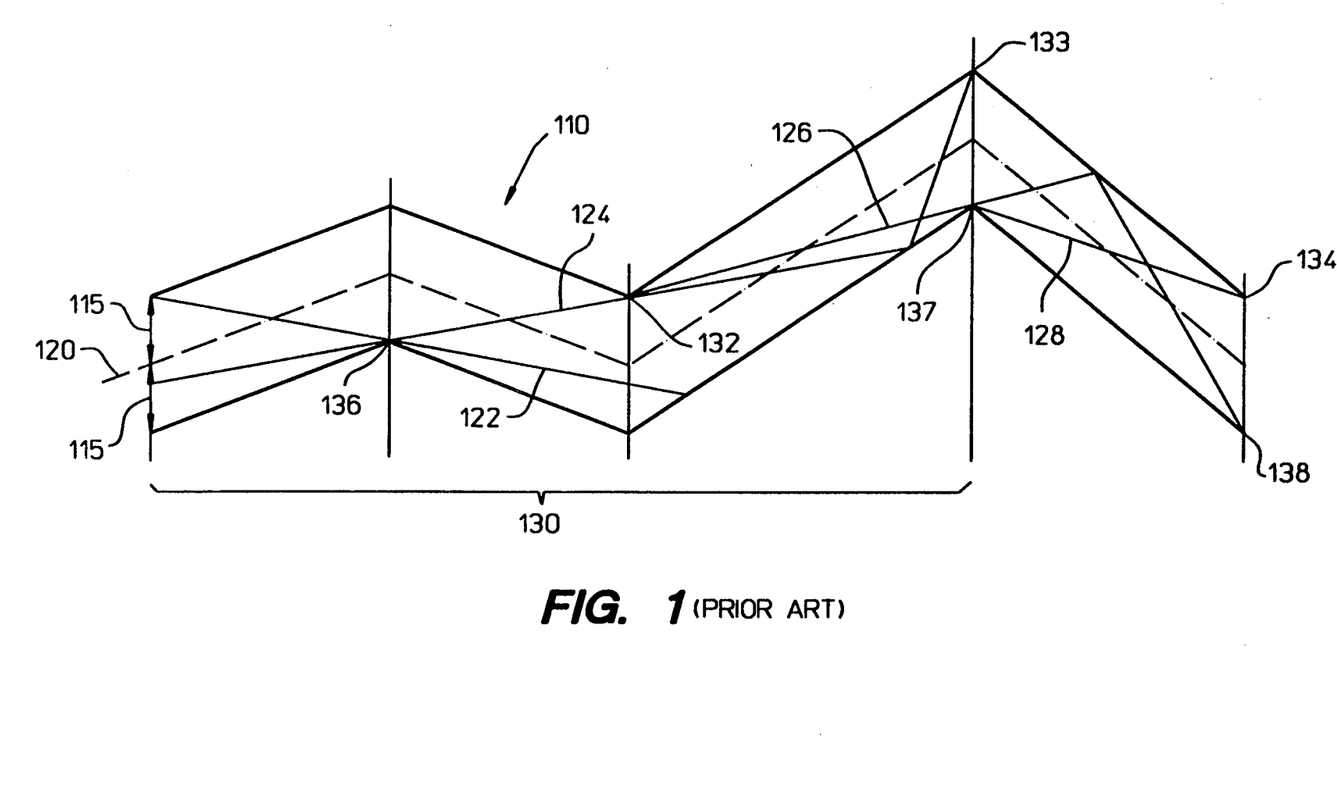
FIG. 1 shows an example of the optimal compression technique in the prior art.

The basic idea of this prior art compression method is depicted in FIG. 1. The method initially constructs a "tunnel" (110) of radius e (115), the acceptable amount of error deviation, around the original data (120), and proceeds to find the farthest point in the tunnel that is accessible, or "visible," from some point on the left boundary of the tunnel, where the data starts. The portion of the tunnel emanating from this starting point and extending to the farthest point in the tunnel which is still visible from the starting point is defined as a "prefix" (130). Such visibility is computed by drawing lines (122, 124, 126, 128) so that the lines are tangent, if at all, to upper (132, 133, 134) and lower (136, 137, 138) sections of the tunnel (110). These tangents, or "extremal rays" (124), define the longest possible prefixes (130) of the upper and lower envelopes of the tunnel, since these extremal rays represent the extreme directions of visibility. Once determined, the extremal ray (124) in this prefix portion (130) of the tunnel becomes a segment of the approximation of the data in the compression, and the procedure is repeated on the remaining portion of the tunnel; the old prefix section is thereafter "discarded" and a new successive prefix section is found.

Figure 2:
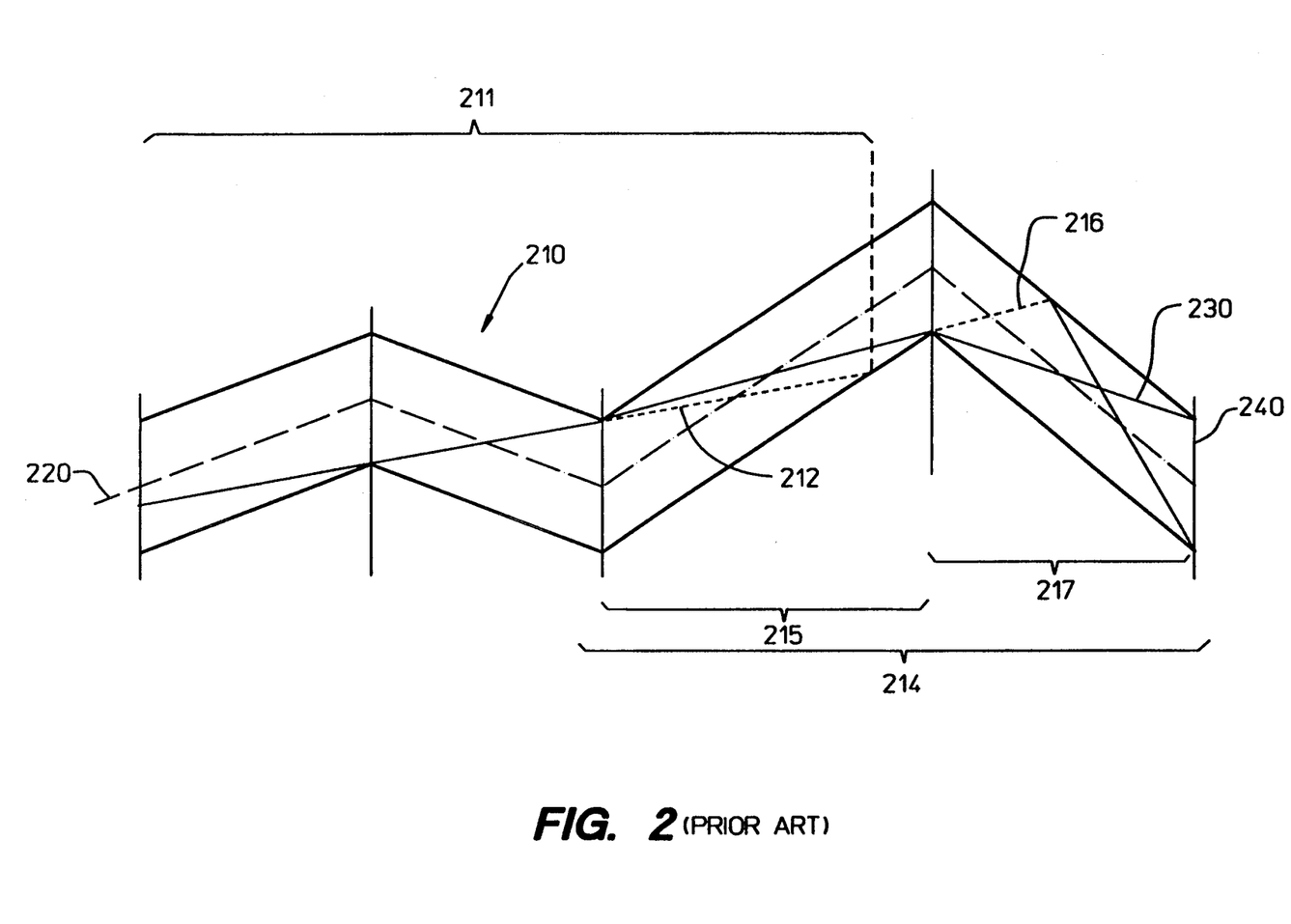
FIG. 2 shows the resultant compressed output signal comprising the approximation segments derived in FIG. 1.
Figure 3:
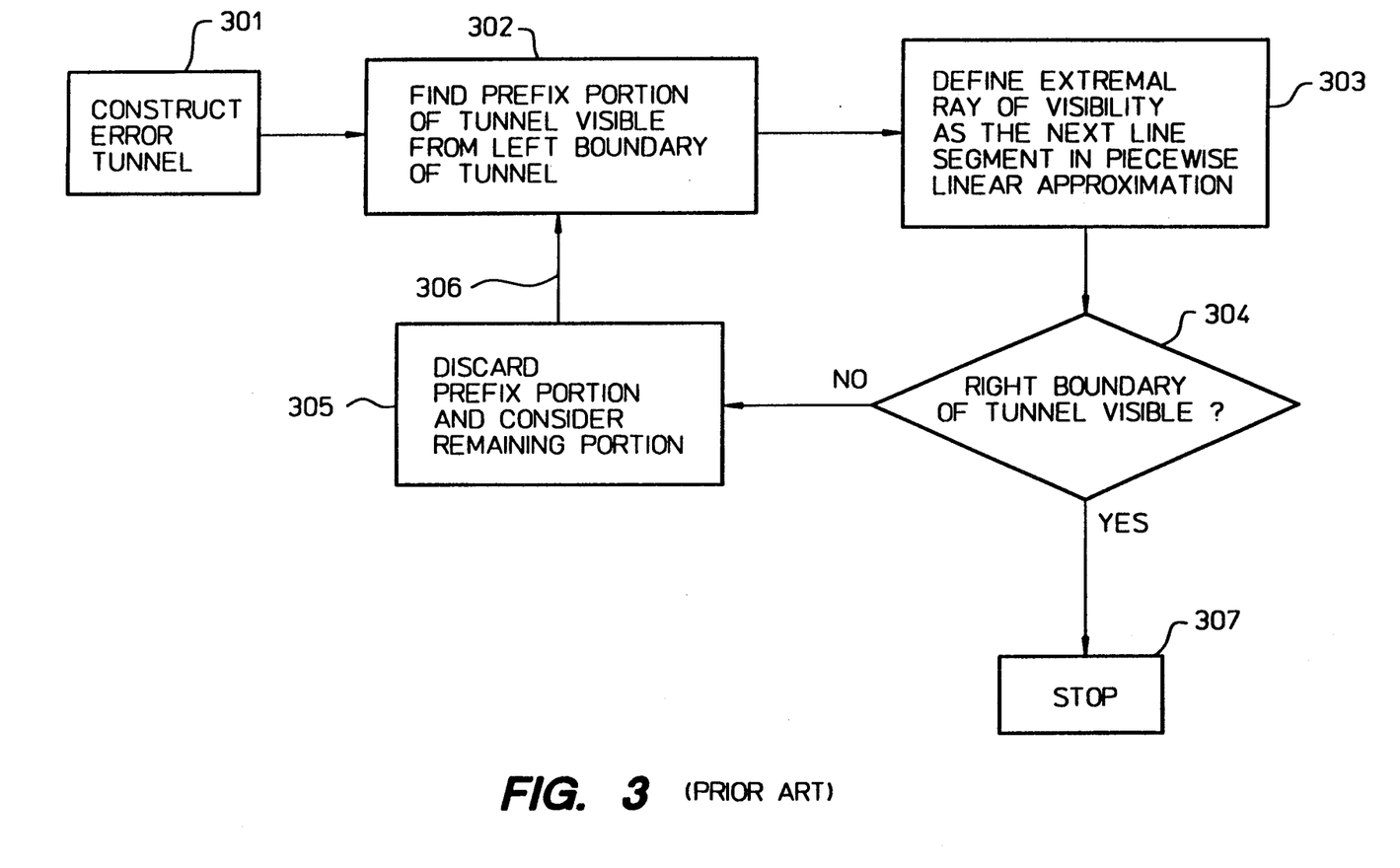
FIG. 3 shows a flow chart of the optimal compression technique in the prior art.

The waveform F(x) (120) in the prior art example in FIG. 1, having an error tunnel (110) around it, is approximated as the compressed output G(x) (230) depicted in FIG. 2. Following the flow diagram of FIG. 3, the prior art method optimally compresses the signal F(x) (120, 220) to obtain the compressed signal G(x) (230) in this manner:

1. Construct (301) an error tunnel (210).
2. Find (302) a first prefix portion (211) of the tunnel visible from the left boundary of the tunnel by determining the extremal ray of visibility (212) in this portion of the tunnel.
3. Define (303) the extremal ray of visibility (212) as the next line segment in the piecewise linear approximation (230) of the input signal F(x) (220).
4. If the right boundary of the tunnel (240) is visible from the first prefix portion (211), the end of the data is reached and the process is terminated (304, 307).
5. If the right boundary of the tunnel (240) is not visible from the first prefix portion (211), then more data is available; truncate the first prefix portion (211) of the tunnel with the extremal ray (212) and discard the first prefix portion (211) of the tunnel from further consideration; retain and consider (305) the remaining portion (214) of the tunnel following the truncation.
6. Loop back (306) to Step 2, above, and repeat, finding a next prefix portion (215) of the tunnel and defining a new next piecewise linear approximation segment in the process from a next extremal ray of visibility (216).
7. When the final prefix portion of the tunnel (217) includes any portion of the right boundary (240), the process can be terminated.

For a specified error, e, in this prior art compression technique, the number of points, or approximation segments, can be shown to be always optimal. The error can be set independently at each sample point, and the technique does not require uniform sampling or specific knowledge of the characteristics of the source. These features make this prior art compression method particularly suitable for a large number of applications.

Many applications, such as the continuous monitoring, transmission, and storage of ECG data of an ambulatory heart patient's heart functions, however, require compression techniques to operate in real time. Furthermore, the compression requirement for this heart patient extends to suitably simple compression hardware which must be sufficiently rugged and portable to reliably accompany the heart monitoring device the heart patient may be carrying.

Even though the above-described prior art compression method operates linearly with a given number of samples, its arithmetic processing becomes prohibitively complex for real time operation on a general purpose processor. The novel compression method according to the present invention greatly simplifies the prior art compression method and, in doing so, allows real time operation without the need for special purpose processors. The novel compression invention, because of its simplification, additionally facilitates implementation of the novel compression technique on a single integrated semiconductor chip. The resultant hardware, then, is simple and portable. Although the simplified compression method in accordance with the preferred embodiment of the invention is no longer optimal, the number of segments in the resultant piecewise approximation of a signal from this method nevertheless is generally a factor of 1.5 of the minimum number resulting from the earlier described optimal compression method in the prior art.

SUMMARY OF THE INVENTION

Imai and Iri have fully described an optimal compression method of the prior art in the literature referenced above. In such a compression method, an approximation of the original data is constructed with a sample set of x-coordinates which is not consistently a subset of the x-coordinates of the original signal, such as at its vertices, or discontinuity points. In accordance with the preferred embodiment of the invention, however, the x-coordinates of the data samples are selected always to be a subset of the x-coordinates of the vertices of the constructed approximation. This selection, although increasing the number of approximation segments from the optimal number of the prior art, greatly reduces the arithmetic complexity of the prior art compression methods without substantially compromising its effectiveness. Specifically, the number of segments constructed by the compression method according to the preferred embodiment of the invention is typically fifty percent more than the minimum number possible with the optimal compression methods of the prior art.

DETAILED DESCRIPTION OF THE INVENTION

Compression Method

Figure 4:
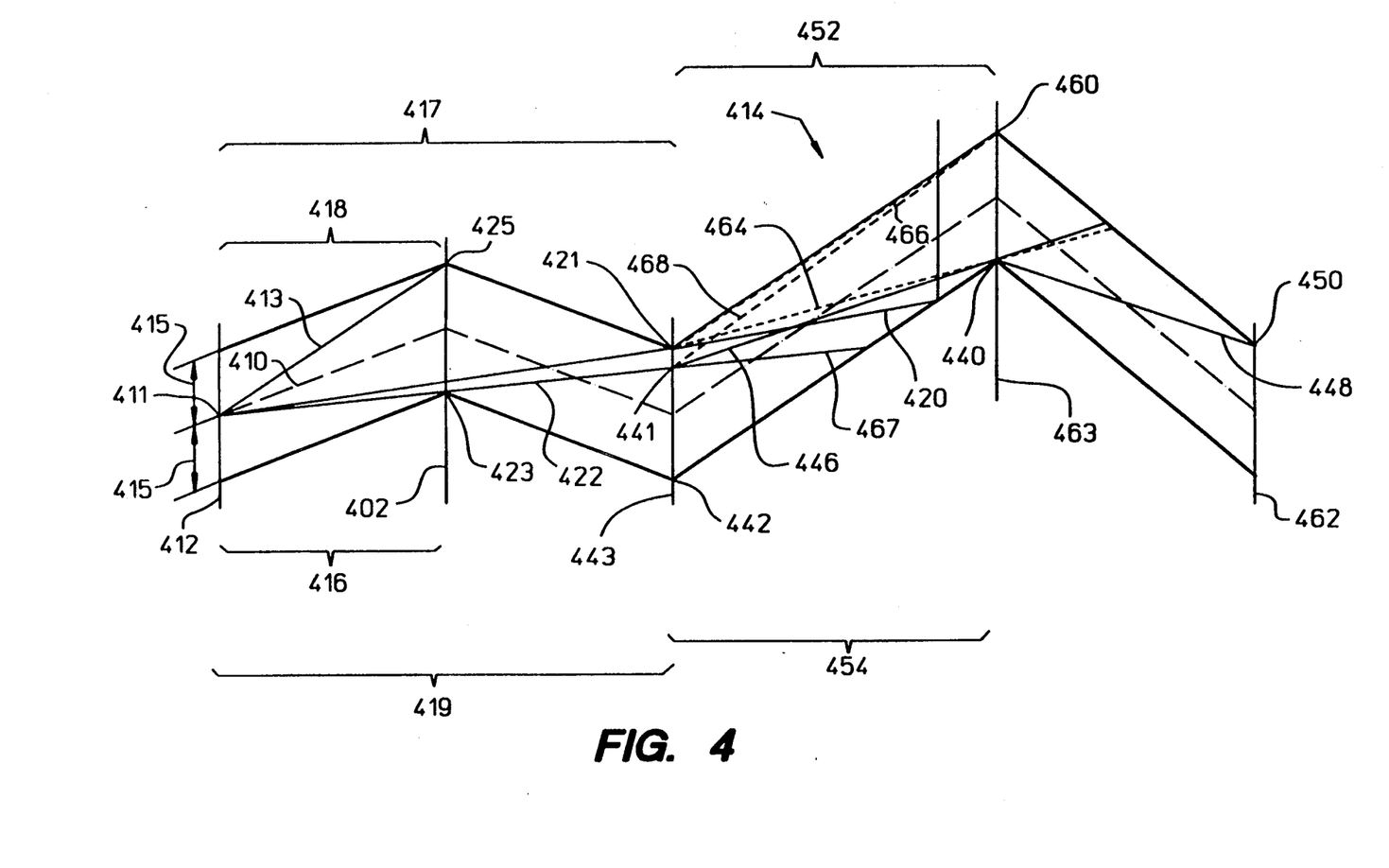
FIG. 4 shows an example of an input signal and its compressed output signal resulting from the novel compression technique in accordance with the invention.

FIG. 4 illustrates the result of following the compression method according to a preferred embodiment of the invention. Starting at an initial point $(x_s, f_s)$ (411) on the left boundary (412) of a tunnel (414) defined by the input signal $F(x)$ (410) and an envelope of a specified radius of error, e (415), the compression method according to the preferred embodiment of the invention draws extremal rays (413, 420, 422) extending from the starting point (411) and tangent to increasingly longer prefix portions of the tunnel. These extremal rays (413, 420, 422) are made tangent to the upper (425, 421) and lower (423) points of the envelope (414). Specifically, initially a lower (416) envelope and an upper (418) envelope are defined by truncating the tunnel to the first two break points, or vertices (423, 425). The novel method then draws a tangent (413, 422) to each of the envelopes (416, 418) from the initial point $(x_s, f_s)$ (411). It then seeks to extend each envelope to the next vertex points (421, 442) and update the tangents (413, 422) to include the next vertex points (421, 442). In this illustration, only the portion of the envelope (416) defined by the lower extremal ray (422) tangent to the lower vertex (423) can be extended to a section (419) that includes the next vertex points (421, 442). Since the upper envelope (418) cannot be extended to include the next vertices (421, 442) and the lower envelope (416) can, the tangent ray (413) to the upper envelope (418) is no longer considered. The accessible vertices (421, 442) covered by the lower extremal ray (422) are "extremal vertices" (421, 442) to this extremal ray (422).

Another extremal ray (420) tangent to the next vertex point (421) on the upper envelope can also be drawn from the starting point (411). This new extremal ray (420) truncates the tunnel (414) to form a new and extended upper envelope (417). Both the extended upper (417) and lower (419) envelopes include all the vertices (423, 425, 421, 442) thus far in the tunnel (414), but neither of them can be extended to include the next set of vertices (440, 460). Hence, the portion of the tunnel (417, 419) containing these extended extremal rays (420, 422) serves as the initial prefix portion of the tunnel for continuing the process.

Either portion of the two extended tangents (420, 422) in this prefix portion (417, 419) of the tunnel can be a segment of the compressed output signal; both are within the limit of error e specified initially. For convenience sake, only the lower tangents, such as that (422) in the lower envelope (419), may be uniformly selected to form the piecewise linear compressed output. The x-coordinate of the next starting point will be identical to that of the vertex points (421, 442) defining the prefix portion (417, 419) of the tunnel. This starting point can be one of two points, an upper one (421) and a lower one (441) on the vertex line (443) defining the prefix (417, 419), depending respectively on the choice of the upper (420) or lower (422) tangent as the output approximation segment for the prefix section (417, 419).

This process is carried on iteratively until no further tangent exists when a next vertex point, such as the one (450) on the right boundary, is included, that is, when a final extremal ray (448) from its starting point (440) intersects the right boundary (462). The novel compression method then outputs, for example, the lower tangent (422) as its first line segment, and cuts off the portion (417) of the envelopes examined so far. The entire process is then repeated on the remaining portion of the tunnel to obtain the second line segment (446), and so on. In this novel compression method according to the preferred embodiment of the invention, selecting the lower or the upper tangent as the output segment thus makes no difference to the outcome. In contrast, the optimal compression method of the prior art selects as output the tangent with the greater visibility into the error tunnel.

This novel compression method can also be described generally as follows. In FIG. 4, an input signal (410) having a series of discontinuities (402, 443, 440) is shown. The level of allowable error, e (415), is added to and subtracted from these points of discontinuity of the input signal to determine the upper (421, 425, 460) and lower (423, 440, 442) limits of the approximation segments at these points. An initial point (411) on the input signal (410) is first selected. Then straight lines (413, 420, 422) which can be drawn from this initial point (411) to include any of the upper (421, 425) and lower (423, 442) limits are identified. In this example thus far, only the first two points of discontinuity (402, 442) are accessible from the initial point (411). Among these identified straight lines (413, 420, 422), only two of them (420, 422) can be extended as least as far as the second discontinuity point (443), the farthest one accessible from the initial point (411). One of these two straight lines, or extremal rays (420, 422), is selected to be part of the approximation output signal. Either one is acceptable, since both are within the bounds of the allowable error, e (415). For convenience, the lower extremal ray (422) is selected.

To minimize the number of approximation segments in the compressed output signal, although without attaining the optimal number, the selected extremal ray (422) is truncated at some point between the farthest accessible point of discontinuity (443) and the point (467) where the selected extremal ray (422) exceeds the allowable level of error (415). For convenience, the extremal ray (422) is truncated at the point of discontinuity (441). Wherever the point of truncation is, however, will be the next initial point (441) for determining the next approximation segment. This process is then reiterated until all the approximation segments for the output signal are obtained when the finally selected extremal ray (448) extends to the end of the input signal (462).

Figure 5:
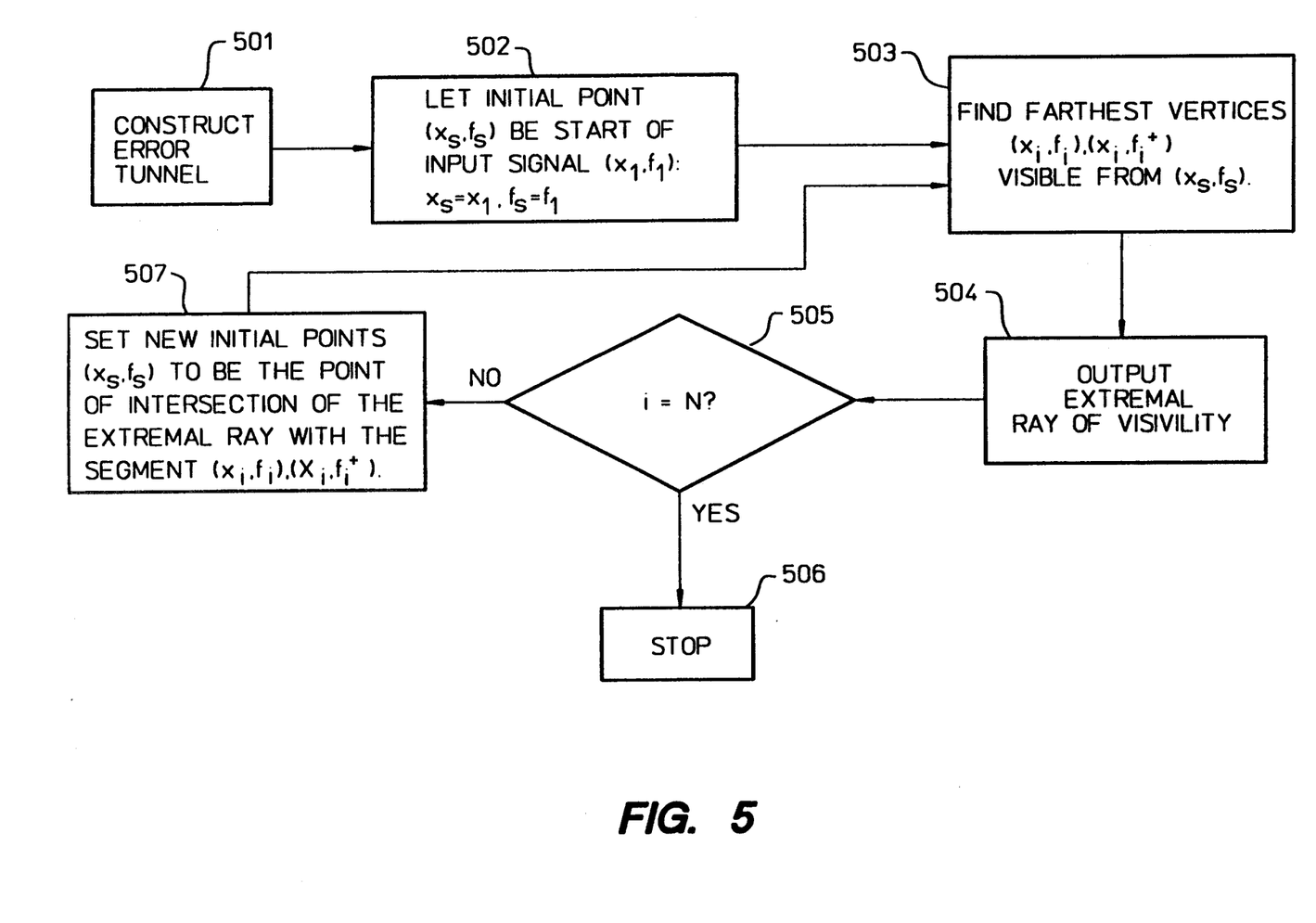
FIG. 5 shows a flow chart of an illustrative implementation of the novel compression technique in accordance with the invention.

The specific implementation of the novel compression method described above is summarized in the flow diagram of FIG. 5; the reference numbers in the example refer to FIG. 4:

1. Construct (501) an error tunnel (414).
2. Start (502) with an initial point (411) on the signal (410), that is, set $x_s = x_1$ and $f_s = f_1$, where (x, f) are coordinates on the signal.
3. Find (503) the largest i such that some point on the vertical line segment (443) defined by an upper vertex point, $(x_i, f_i^+)$ (421), and a lower vertex point, $(x_i, f_i^-)$ (442), is visible from the starting point, $(x_s, f_s)$ (411).
4. Output (504) the extremal ray of visibility (422) as a segment of the compressed signal, $G(x_i)$ (422, 446, 448).
5. If the desired number of samples N is reached, stop (506).
6. If the desired number of samples N has not been reached, set (507) a next starting point, $(x_s, f_s)$, for example, the lower point (441) of the two points (421, 442) of intersection of the extremal rays (420, 422) with the vertical segment defined by the vertices, $(x_i, f_i^-)$ (442) and $(x_i, f_i^+)$ (421). Alternatively, the upper point of intersection (421) as well as any point along both upper and lower extremal rays between their respective points of intersection and the tunnel can also be chosen as the next starting point. Then other tangent lines (464, 466) originating from these alternate next starting point (421) are drawn to the next set of vertices (440, 460).
7. Loop back (508) to Step 3, above, and repeat.

The salient differences between this compression method according to the preferred embodiment of the invention and the prior art optimal method are the following points: (1) the starting point of the tangents is a fixed point on the left end, or start, of the error tunnel and (2) the x-coordinate of the end point of an output segment can always be made an x-coordinate of one of the original data samples.

These differences allow the new method to be implemented in an efficient and pipelined manner; they eliminate the need for the complex data structures required in the prior art optimal method. Furthermore, the number of arithmetic operations in the new method is substantially less than that required in the optimal method of the prior art.

Figure 9:
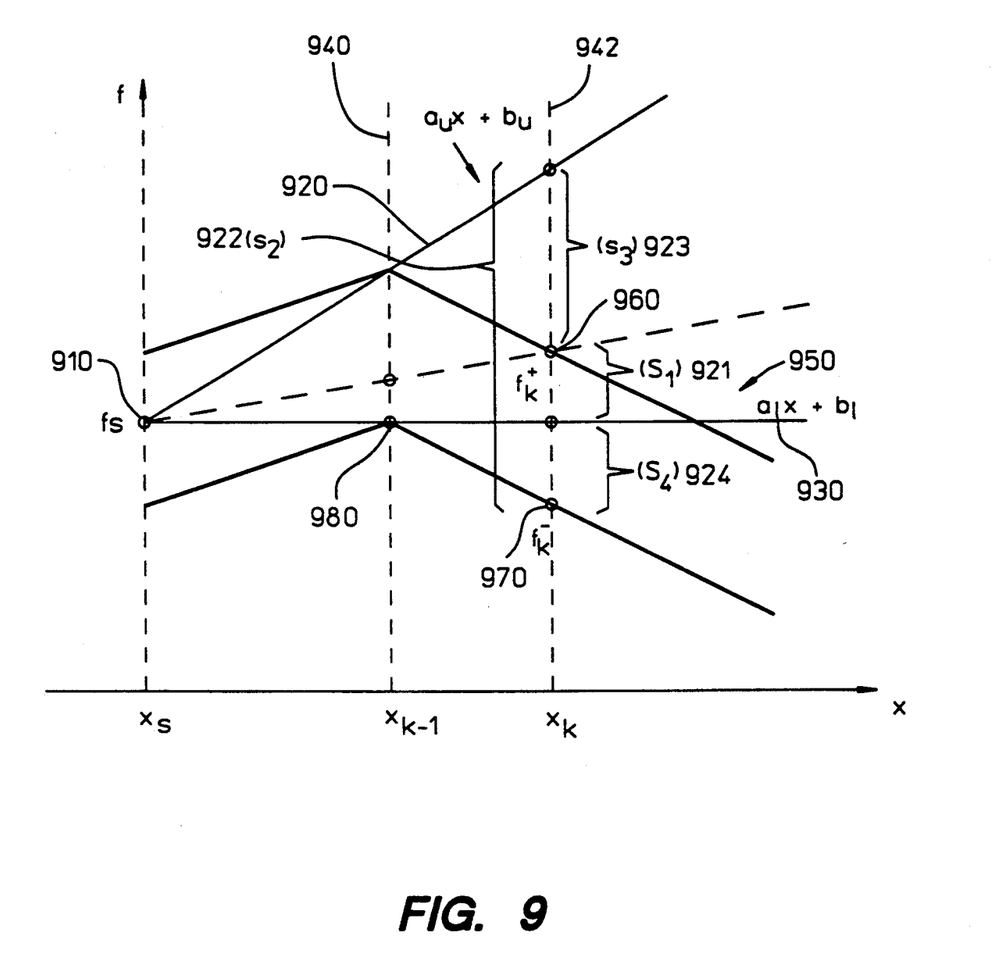
FIG. 9 shows the mathematical representations in the line compression technique according to the preferred embodiment of the invention.

Mathematically, the compression technique in accordance with the preferred embodiment of the invention can be analyzed from an initial sequence of data samples $\{x_i, f_i^+\}$ and $\{x_i, f_i^-\}$, for $i = 1, 2, \ldots, N$, where N is the total number of samples. As shown in FIG. 9, if the starting index point (910) of the portion of the waveform under consideration at some stage of the technique is denoted as $(x_s, f_s)$, and the index point representing the longest prefix of the error tunnel separable by an upper tangent $t_u = a_u x + b_u$ (920) and a lower tangent $t_l = a_l x + b_l$ (930) passing through the starting point $(x_s, f_s)$ (910), by $x_{k-1}$ (940).

From the previous discussion, the novel compression technique first checks to see if it is possible to include the x-coordinate of the next point, $x_k$ (940), in the tunnel prefix (950), or the portion of the tunnel under consideration. to determine if the upper error limit, $f_k^+$ (960), is above the lower tangent, $t_l$ (930), and the lower error limit, $f_k^-$ (930), is below the upper tangent, $t_u$ (920), the compression technique then determines the signs of $$S_1(k) = f_k^+ - (a_l x_k + b_l) = f_k^+ - a_l(x_k - x_s) - f_s > 0, \quad \text{Eq. (1a)}$$

$$S_2(k) = f_k^- - (a_u x_k + b_u) = f_k^- - a_u(x_k - x_s) - f_s < 0, \quad \text{Eq. (1b)}$$

where S signifies the vertical distance (921, 922, 923, 924) between an error limit (960, 970) and a tangent (920, 930). If any of these conditions is not met, then the while-loop terminates and the method in accordance with the invention computes the output point $G(x_{k-1})$ (980):

$$G(x_{k-1}) = a_l x_{k-1} + b_l = a_l(x_{k-1} - x_s) + f_s. \quad \text{Eq. (2)}$$

Otherwise, the technique continues by checking if the upper error limit, $f_k^+$ (960), is above the upper tangent (920) and the lower error limit, $f_k^-$ (970), is below the lower tangent (930). Thus, the technique determines the signs of $$S_3(k) = f_k^+ - (a_u x_k + b_u) = f_k^+ - a_u(x_k - x_s) - f_s > 0, \quad \text{Eq. (3a)}$$

$$S_4(k) = f_k^- - (a_l x_k + b_l) = f_k^- - a_l(x_k - x_s) - f_s < 0. \quad \text{Eq. (3b)}$$

If any of these determinations fails, for example, in FIG. 9 where the upper error limit, $f_k^+$ (960), is below the upper tangent (920) to make $S_3 < 0$, then the technique computes a new tangent. For example, for the new upper tangent, its slope $a_u$ and its offset $b_u$ will be:

$$a_u = \frac{f_k^+ - f_s}{x_k - x_s}, \text{ and} \quad \text{Eq. (4)}$$

$$b_u = f_s - a_u x_s, \quad \text{Eq. (5)}$$

Figure 6:
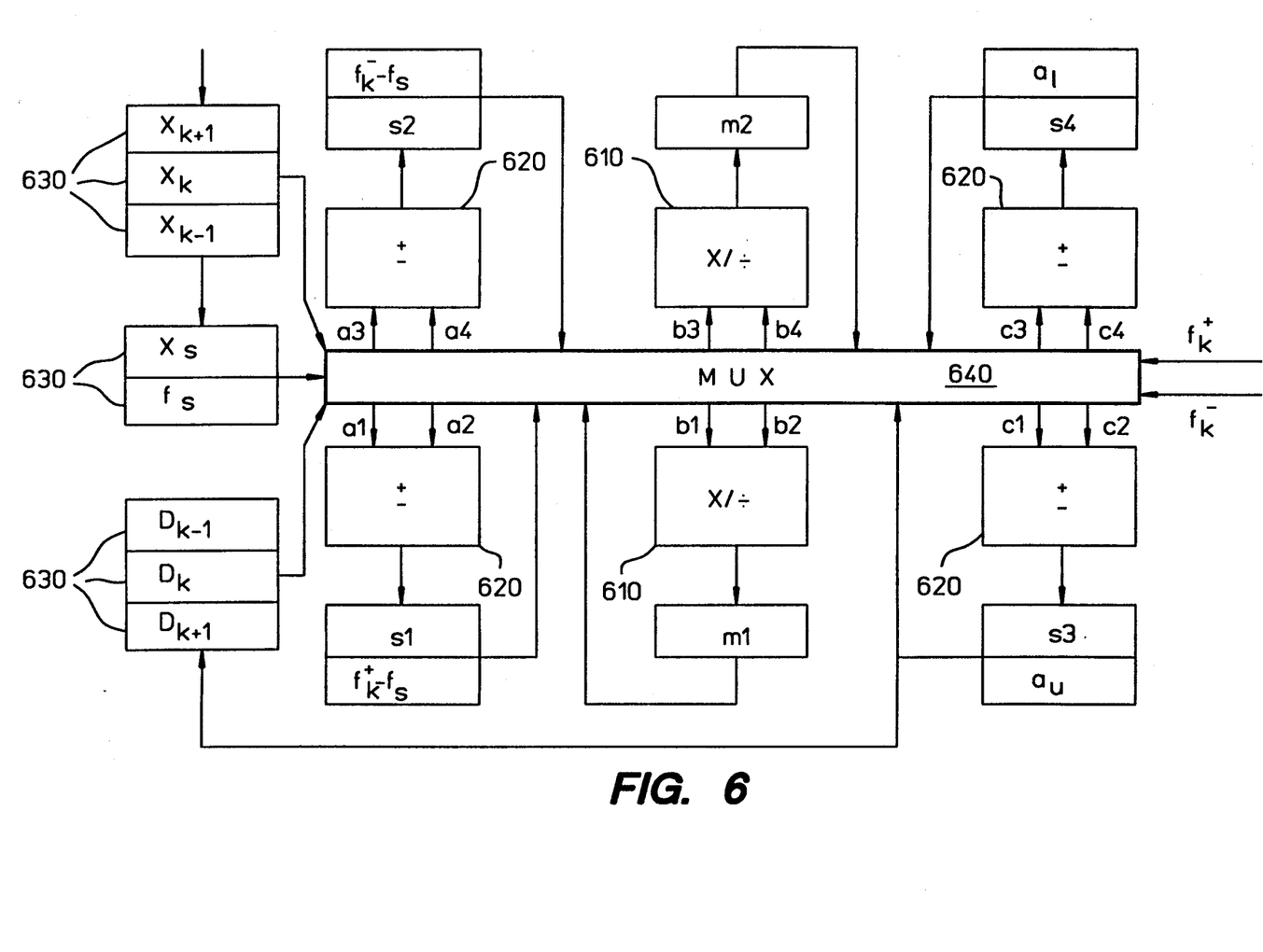
FIG. 6 shows a preferred hardware embodiment of the invention.

Equations (1)–(5) represent the main computation requirements for the hardware implementation of the preferred embodiment of the invention, and FIG. 6 shows a block diagram of the arithmetic processing unit and the register file for their evaluation.

Hardware Implementation

In the hardware implementation of the compression method according to the preferred embodiment of the invention as illustrated in FIG. 6, the system preferably consists of two multiplier/divide units (610), four adder/subtractor units (620), data registers (630), and input multiplexers (640). One of the more compute-intensive operations in a compression implementation is the division in the evaluation of the slope a of a line, Equation (4). For example, for floating-point accuracy and using an iterative method of division, the division process may take up to 12 clock cycles. However, in uniformly sampled data, this division can be replaced by a single subtraction and a single multiplication. Thus, if data is uniformly sampled, the divide units (610) can be reduced or even completely eliminated with a look-up table replacement. The architecture of the preferred embodiment of the invention also allows pipelining of computations to process each data point in two clock cycles. Thus, the architecture can be modified advantageously with respect to timing and data constraints. In the present example, the arithmetic unit uses two multiplier/divider units for the parallel evaluation of the slopes of the upper and lower tangents. Division is performed by using a multiplier and one adder, a lookup read-only-memory (ROM) (not shown) and the iterative method known as the Newton-Raphson iterative method. The lookup ROM can be advantageously shared by both multipliers, and it provides a first estimate of the reciprocal of the divisor.

Except for the divider units (610), which can be advantageously replaced by a look-up table (not shown) in an alternate preferred embodiment, the main feature of the design shown in FIG. 6 is the use of four adder/subtractor units (620) operating in parallel. Evaluation of Equations (1a), (1b) and (3a), (3b) requires a minimum of two multiplication operations and seven subtraction operations. This design in pipelined mode, however, allows computation of Equations (1a), (1b) and (3a), (3b) in two cycles, with a three-cycle initial pipeline delay.

In contrast to this simple implementation, the assembly code generated using the C-compiler for the Texas Instruments TMS320C40 DSP processor operating in a compressor technique of the prior art shows that at least twelve instructions are needed for evaluating Equation (1a) alone, even in a pipelined mode. This lengthy operation may be because Equations (1a), (1b) and (3a), (3b) do not conform to the typical multiply/accumulate operation for which general purpose digital signal processors (DSP's) are designed to be efficient.

In the illustrated hardware example in FIG. 6, differences $D_k = x_k - x_s$, for $k = 1, 2, \ldots, N$, and $D_{k+1}$ is computed in parallel with the other tests. After every two cycles, a controller can perform all sign tests. If any of the tests fails, then the rest of the computations in the pipeline is discarded, and the controller initiates either output G(x) or slope a(x) computations.

Processor Architecture

Figure 7:
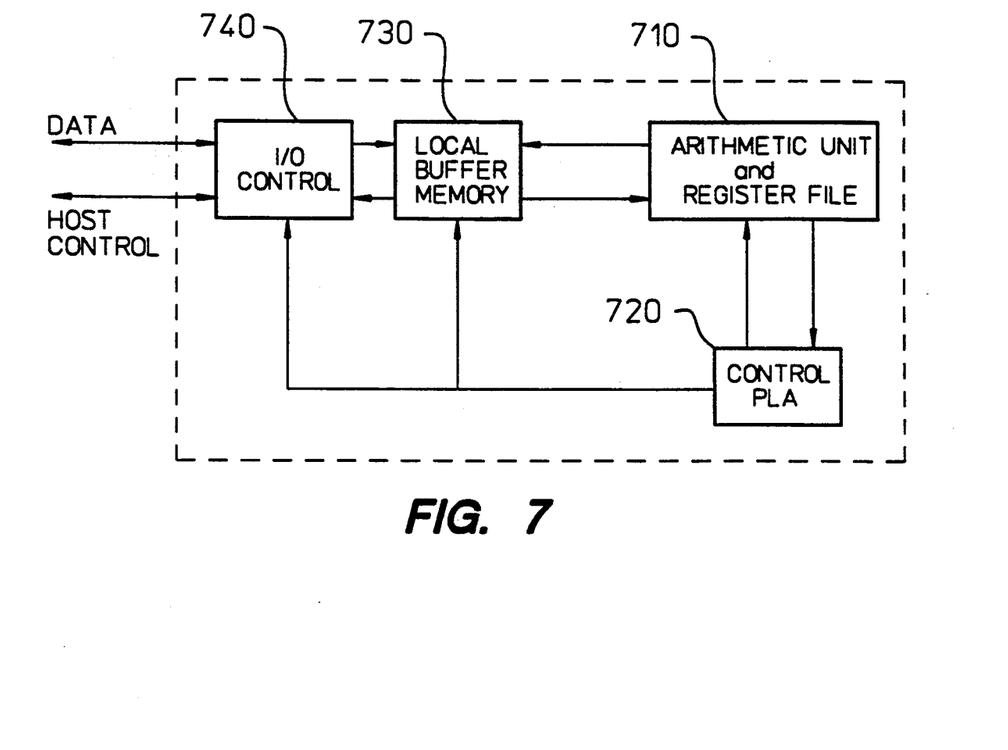
FIG. 7 shows the architecture for an apparatus implementation of the compression technique in accordance with the invention.

FIG. 7 shows the block diagram of an illustrative complete design for a signal compression processor in accordance with the preferred apparatus embodiment of the invention. In addition to an arithmetic unit (710), the design includes a programmable logic array (PLA) for control (720), a small local buffer memory (730), and an input/output (I/O) unit (740) for interfacing with external memory and host microprocessor (not shown). Theoretically, the main compute stage of this compression technique depends only on the components shown in the block diagram of FIG. 7. However, because of the pipelined processing in the arithmetic unit, additional data may need to be stored in the local buffer memory (730).

This design assumes serial data communication between host and compression processors. If the host processor needs to be interrupted only infrequently, then one can add additional local memories to the compression processor, and compression can be performed on blocks of data. For efficient processing, three local memories would preferably be used for the data on the index point, $x_k$, and the upper and lower error limits, $f_k^+$, $f_k^-$. In data compression of a line, maximum compression is achieved when a single line can approximate all such data on the sampled points, $\{x, f\}$. Thus, if the compression processor operates on blocks of data, then the size of the blocks and the size of the internal memory units are bounded by the maximum expected compression ratio. For example, with sampled ECG data having a peak-to-peak value of 751 mV and an absolute error e in the range of 10 to 30 mV, simulation results yield a maximum average compression ratio of 11:1. Thus, memory sizes of 16–32 words would be adequate.

Compression of ECG Data

The above compression architecture implements compression in accordance with the preferred embodiment of the invention without taking into account the nature of the source data. In many applications, the design can be further refined and simplified depending on the nature of the input data and the expected compression ratios. For example, in the important case of processing ECG data, the design for data compression can be further simplified since the ECG data is uniformly sampled. And in cases where there is no capability or desire for continuous hardcopy generation and there is limited memory storage, such as with ECG data, compression of data is particularly important as shown by Y. Ohtaki, K. Toraichi, and Y. Ishiyama in "On Compressing Method of EEG Data for Their Digital Database," *IEEE Proc. ICASSP-92*, pp. IV-581–IV-584, San Francisco (1992). The case in which the remote and continuous monitoring of an active patient who carries a portable ECG unit with local storage can exemplify this importance.

Figure 8:
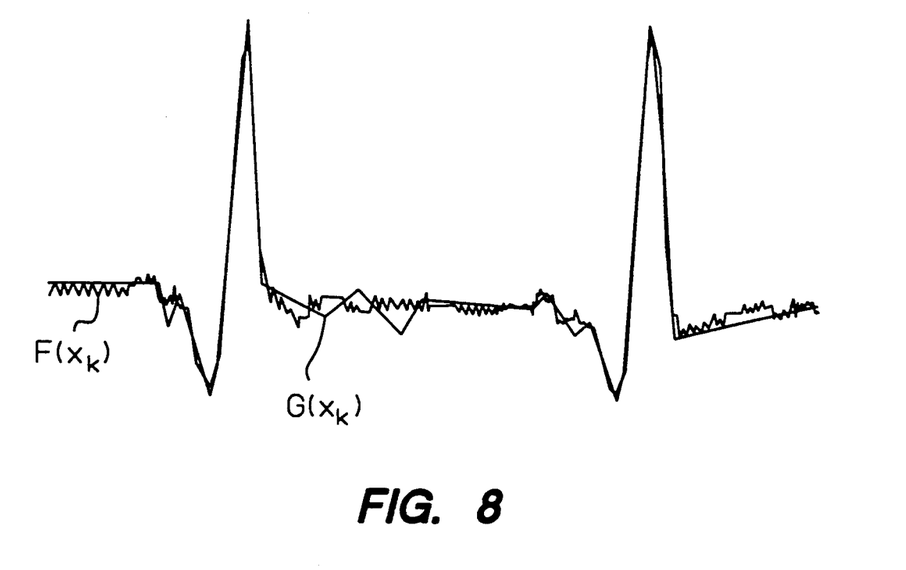
FIG. 8 compares the original input signal in an ECG system with the compressed output signal resulting from the compression technique in accordance with the invention.

As described earlier, the compression technique in accordance with the preferred embodiment of the invention allows the tolerance to be set independently at different segments of the input waveform, or even at each sample point. This flexibility is particularly useful in the compression of ECG waveforms, where different compression tolerances may be needed to be applied on the so-called ST and PQ segments. In practice, the generation of the appropriate upper and lower data envelopes can be generated either by a host processor, or by a local arithmetic unit during the I/O process. FIG. 8 shows part of an ECG waveform and its compressed output with an error, e, of 30 mV.

We claim:

1. A method for approximating an input signal having points of discontinuities to a specified level of error with piecewise linear segments comprising the steps of:

(A) selecting an initial point on the input signal;

(B) determining linear lines originating from the initial point which include at least one of the points of the upper and lower limits of the specified level of error at points of discontinuity on the input signal accessible from the initial point;

(C) selecting one of the linear lines which is extendable to the farthest point of discontinuity accessible from the initial point; and (D) truncating the selected linear line at a point no closer than the farthest point of discontinuity for inclusion as one of the piecewise linear segments approximating the input signal.

2. The method of approximating an input signal of claim 1, further comprising the steps of:

(a) selecting the point of truncation as a next initial point;

(b) determining next linear lines originating from the next initial point which include at least one of the points of the next upper and lower limits of the specified level of error at points of discontinuity accessible from the next initial point;

(c) selecting one of the next linear lines which is extendable to the farthest point of discontinuity accessible from the next initial point; and (d) truncating the next selected next linear line at a point no closer than at the farthest point of discontinuity for inclusion as one of the piecewise linear segments approximating the input signal.

3. The method of approximating an input signal as in claim 2, further comprising the step of:

iteratively returning to Step (a) and repeating the sequence of Steps (a) through (d), using the last point of truncation as a new next initial point for determining additional piecewise line segments for inclusion in the approximation of the input signal, until the new next linear line originating from the new next initial point extends to the end of the input signal.

4. A method for determining approximation segments in an output signal resulting from compressing an input signal to a selected level of error comprising the steps of:

(a) enveloping the input signal with the selected level of error to form a tunnel of the input signal and error, wherein the beginning of the input signal is the start of the tunnel and the ending of the input signal is the end of the tunnel;

(b) selecting a first initial point in the tunnel;

(c) extending one or more first tangent lines from the first initial point into the tunnel such that each of the first tangent lines is tangent to at least one and only one vertex farther in the tunnel accessible from the first initial point;

(d) determining the first tangent lines which extend to the accessible vertex farthest into the tunnel for first extremal rays, such accessible vertex being a first extremal vertex;

(e) selecting one among the first tangent lines which extend at least as far into the tunnel as the first extremal vertex to be a first selected tangent line; and (f) truncating the first selected line at least at a point where the first selected line and the depth of the first extremal vertex in the tunnel intersect for use as a first approximation segment in the output signal.

5. The method as in claim 4, wherein the first initial point is a point on the input signal.

6. The method as in claim 4, further comprising the steps of:

(a) selecting the point of truncation at least at the intersection of the first selected line and the depth of the first extremal vertex in the tunnel to be a next initial point;

(b) extending one or more next tangent lines from the next initial point into the tunnel such that each of the next tangent lines is tangent to one and only one vertex farther in the tunnel accessible from the next initial point;

(c) determining the next tangent lines which extends to the accessible vertex farthest into the tunnel for a next extremal ray, such accessible vertex being a next extremal vertex;

(d) selecting one among the next tangent lines which extend at least as far into the tunnel as the next extremal vertex to be a next selected tangent line; and (e) truncating the next selected line at least at a point where the next selected line and the depth of the next extremal vertex in the tunnel intersect for use as a next approximation segment in the output signal.

7. A method of compressing an input signal comprising the method of claim 5, further comprising the steps of:

(A) selecting the point of truncation at least at the intersection of the next selected line and the depth of the next extremal vertex in the tunnel to be a further initial point;

(B) extending one or more further tangent lines from the further initial point into the tunnel such that each of the further tangent lines is tangent to at least one and only one vertex farther in the tunnel accessible from the further initial point;

(C) determining the further tangent line which extends to the accessible vertex farthest into the tunnel for a further extremal ray, such accessible vertex being a further extremal vertex;

(D) selecting one of the further tangent lines which extend at least as far into the tunnel as the further extremal vertex to be a further selected tangent line;

(E) truncating the further selected line at least at a point where the further selected line and the depth of the further extremal vertex in the tunnel intersect for use as a further approximation segment in the output signal; and (F) repeating the above Steps (A)–(E) to obtain additional approximation segments until the end of the tunnel is reached.

8. A method of compressing an input signal to an output signal having N number of approximation segments comprising the method of claim 5, further comprising the steps of:

(A) selecting the point of truncation at least at the intersection of the next selected line and the depth of the next extremal vertex in the tunnel to be a further initial point;

(B) extending one or more further tangent lines from the further initial point into the tunnel such that each of the further tangent lines is tangent to one and only one vertex farther in the tunnel accessible from the further initial point;

(C) determining the further tangent line which extends to an accessible vertex farther into the tunnel for a further extremal ray, such accessible vertex being a further extremal vertex;

(D) selecting one among the further tangent lines which extend at least as far into the tunnel as the further extremal vertex to be a further selected tangent line;

(E) truncating the further selected line at least at a point where the further selected line and the depth of the further extremal vertex in the tunnel intersect for use as a further approximation segment in the output signal; and (F) repeating the above Steps (A)–(E) to obtain additional approximation segments until N number of approximation segments is reached.

* * * * *